United States Patent Office 3,061,581
Patented Oct. 30, 1962

3,061,581
VINYL MODIFICATION OF BRANCHED CHAIN POLYAMIDES
Stanley P. Rowland and Melvin F. Maringer, Cincinnati, Ohio, assignors to National Distillers and Chemical Corporation, New York, N.Y., a corporation of Virginia
No Drawing. Filed July 9, 1959, Ser. No. 825,875
12 Claims. (Cl. 260—45.5)

This invention relates to novel chemical derivatives of synthetic linear polyamides and to processes for producing the same. More particularly, the invention pertains to treatment of certain polyamides with specific modifying compounds.

The polyamides used for preparation of the novel products herein described may be prepared by reacting a diamine with dicarboxylic acid reactants or an amide-forming derivative of said dicarboxylic acid reactants, the reaction being carried out under condensation polymerization conditions until polyamides of relatively high molecular weight are produced.

The diamine reactant is characterized by having at least one hydrogen atom attached to each nitrogen atom. Suitable diamines include the primary diamines. Aliphatic diamines are preferred, such amines being characterized by having the nitrogen atoms attached to aliphatic carbon atoms. More perferably, the aliphatic diamines contemplated for usage are those of relatively long chain length, as for example, a chain length of four or more carbon atoms, with specific examples thereof being aliphatic diamines such as tetramethylene diamine, pentamethylene diamine, hexamethylene diamine, octamethylene diamine, decamethylene diamine, dodecamethylene diamine, 1,6-diaminooctane, 3,6-diaminooctane, 2-ethyl-1,8-diaminooctane, 2,5-diethyl-1,6-diaminohexane, and the like. Structurally, diamines suitable for practice of this invention may be defined as having the formula, $NH_2RNH_2$ in which R is a divalent hydrocarbon radical free from olefinic and acetylenic unsaturation and which has a chain length of at least four carbon atoms. Although such amines in which R is an aliphatic chain are preferred, diamines of the aforesaid structural formula in which R may be alicyclic, aromatic or arylaliphatic and in which the amino groups are attached to aliphatic carbon atoms, are also contemplated.

The dicarboxylic acid reactant comprises isomeric, branched chain $C_{10}$ aliphatic dicarboxylic acids, and mixtures thereof with aliphatic dicarboxylic acid such as sebaic, adipic, and azelaic, the branched chain dicarboxylic acids, and especially a mixture of such $C_{10}$ dicarboxylic acids made up from and including substantial amounts and major proportions of 2-ethylsuberic and 2,5-diethyladipic acids. These branched chain $C_{10}$ dicarboxylic acids and mixtures thereof are preferably, but not necessarily, obtained as mixtures and by the method disclosed in U.S. Patent No. 2,816,916. Thus, the polyamides to which the invention relates may be prepared by reaction between a suitable diamine and one or more branched chain $C_{10}$ dicarboxylic acids having at least one $C_2$ branch per molecule. Preferred mixtures of aliphatic $C_{10}$ dicarboxylic acids comprise a major proportion of the branched chain dicarboxylic acids and, more specifically, about 5–45% sebacic acid, about 50–80% 2-ethylsuberic acid, and about 5–15% 2,5-diethyladiphic acid. Removal of a portion of the sebacic acid produces an isomeric mixture of $C_{10}$ aliphatic dicarboxylic acids containing about 72–80% 2-ethylsuberic acid, about 10–20% of 2,5-diethyladipic acid, and the remainder, about 5–15%, substantially sebacic acid. The polyamide feed material as embodied herein are prepared by subjecting a suitable diamine and the appropriate dicarboxylic acid reactants to amidation or transamidation reaction conditions with elimination of water or other by-products formed by the reaction. In accordance with the preferred method of this invention, the polyamides will be prepared from 2-ethylsuberic acid, 2,5-diethyladipic acid and mixtures thereof. It will be understood, however, that minor amounts of sebacic, adipic, and/or azealaic acid may be present in the dicarboxylic acid feed; and, furthermore, that the use of the total mixture of $C_{10}$ dicarboxylic acids prepared by the process of U.S. Patent No. 2,816,916 is contemplated. Thus, the polyamides used in the process of this invention are characterized by containing a plurality of units of the following structure:

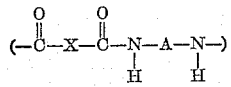

in which X is a hydrocarbon portion of a saturated aliphatic dicarboxylic acid having from about 6 to 10 carbon atoms per molecule, and A is a hydrocarbon portion of a diamine; said polyamides being further characterized in that the major proportion of such units of the aforesaid polyamide structure are such that X is the hydrocarbon portion of a $C_{10}$ saturated aliphatic dicarboxylic acid containing at least one $C_2$ branch chain per molecule.

The polyamides embodied herein can be prepared by heating in substantially equimolecular amounts a suitable diamine and the dicarboxylic acid reactant under condensation polymerization conditions, generally from about 180° to about 300° C., in the presence or absence of a diluent, until relatively high molecular weight linear condensation polyamides are obtained and, preferably, until the polyamide possesses fiber-forming properties. The preparation of polyamides may be carried out in any of several ways. For example, the diamine and dicarboxylic acid reactant may be intimately mixed in proper proportions and the mixture subjected to condensation-polymerization conditions in which case the first reaction that occurs is the formation of diamine-dicarboxylic acid salts, followed by polymerization to formation of polyamides. Another method comprises preparation of a mixture of proper proportions of the diamine and dicarboxylic acid reactant and subjecting the mixture to conditions for formation of diamine-dicarboxylic acid salts, isolation of the salts, purification thereof if desired, and subjecting the salts to reaction conditions for polyamide formation.

As aforesaid, polyamides as embodied herein may also be prepared by use of an amide-forming derivative of the dicarboxylic acid component or components. For such preparations, use is contemplated of amide-forming derivatives of the branched chain $C_{10}$ dicarboxylic acids, and/or of other dicarboxylic acids used in admixture therewith, such amide-forming derivatives including anhydrides, amides, acid halides, half-esters and diesters which are known to form amides when reacted with a primary or secondary amine. Specific amide-forming derivatives contemplated for use herein include esters of the branched chain $C_{10}$ dicarboxylic acids, illustrative of which are the diethyl and dimethyl esters of 2-ethylsuberic acid and of 2,5-diethyladipic acid and mixtures thereof. The reactions are carried out under a blanket of dry, oxygen-free nitrogen at both atmospheric and subatmospheric pressures and under suitable reaction temperatures by provision of constant temperature conditions. It will be understood, however, that the exact method of preparing the polyamides is not an essential feature of the present invention.

Examples of specific polyamides to be treated in accordance with the process of this invention include polyhexamethylene 2-ethylsuberamide, polyhexamethylene 2,5-diethyladipamide, and copolyamides derived from, for example, the total C₁₀ dicarboxylic acid mixture described above. Although these polyamides have a number of uses, their low softening points (below about 200° C.) and high solubility in substances such as ethanol and hydrochloric acid are limiting factors. It would be advantageous, therefore, to have a method for altering these polyamides so as to elevate their softening points and to improve their solvent resistance.

One object of this invention is to modify the aforementioned polyamides so as to enhance their utility. Another object is to improve such properties as softening point, resistance to solvents, clarity, hardness, and the like. Further objects and advantages of the present invention will appear from the more detailed description set forth below.

In accordance with the present invention, these objects are accomplished by treating the polyamides with compounds selected from the group consisting of acrylonitrile, styrene, and vinyl toluene. It has been further found that acrylonitrile is a particularly outstanding modifier, since the use of small amounts of this compound lead to an unusually large increase in softening point as well as to greatly improved solvent resistance. The exact mechanism involved in the treatment is not completely understood, although it is believed a reaction occurs between the polyamide and the modifier. This appears to be borne out by the fact that the use of xylene in place of the styrene modifier did not give similar results.

The modified polyamides embodied herein may be prepared by heating suitable amounts of the polyamide and the modifier, generally from about 80° C. to about 200° C., with or without a catalyst, until modified polyamide products with appreciably higher softening points and improved solvent resistance are obtained. In one manner of carrying out the reaction, the proper proportions of polyamide, modifier, and catalyst (when employed) are first intimately mixed. Contact of the reactants may be facilitated by employing the polyamide in a finely divided form, such as may be obtained by controlled precipitation from a solvent or by efficient mechanical milling. Intimate contact of the reactants may also be facilitated by compaction under pressure of the reactant mixture prior to and/or during the heating step. The modification reaction is carried out by submitting the intimate mixture of reactants to one or more heating steps in a suitable reaction vessel. As mentioned before, pressure may be applied during the reaction.

The function of a heating step is twofold: it causes the reaction between the polyamide and the vinyl compound to take place, and it effects the volatilization of the unreacted vinyl compound. To facilitate the latter, provision should be made to allow the escape of volatiles from the reaction zone. One possible method of operation involves venting the reaction vessel after the desired amount of vinyl compound has been reacted. The extent of reaction may be determined by routine experiment. It is dependent upon such factors as the ratio of vinyl compound to polyamide, the particular vinyl compound used, and the degree of modification desired. Another method by which volatiles may be removed, and in some cases further reaction enhanced, involves conditioning in an oven, preferably of the air circulating type, of unconfined modified polyamide products at temperatures below their softening points.

The elevated temperatures which may be used in carrying out the reaction may vary from about 80° C. to about 300° C., although the upper temperature is not critical as long as it is below the decomposition temperature of the reactants and the desired products. Below 80° C., the reaction is undesirably slow. Above 200° C., the loss of vinyl compound may be inordinately large where a vented system is used. In a closed system, however, temperatures up to about 300° C. could be employed before degradation of the polymer would become excessive. It is preferred to carry out the reaction between about 100° C. and 150° C. If a subsequent conditioning of the unconfined modified polyamide is employed, the temperature during this conditioning may range from room temperature up to the softening point of the particular modified polyamide. A preferred range is from about 60° C. to about 10° C. below the softening point of the modified polyamide.

The time required for reaction and conditioning to produce the desired improvement in properties for a polyamide modified by a selected proportion of a particular vinyl compound may be determined by routine experiment. Substantial improvement in properties has been observed after as little as 20 minutes' reaction time. Maximum improvement make take as long as 180 minutes to achieve. It will be understood, however, that the required time period can readily be determined by routine experimentation.

As little as 0.05 part of the vinyl compound added to one part of polyamide produces surprising and substantial increases in softening point and solvent resistance. It is preferred to add from about 0.05 to 0.25 part of the vinyl compound to one part of the polyamide. While the addition of greater proportions of vinyl compound will not be deleterious per se to improvements in softening point and solvent resistance, generally little or none of the excess over the preferred maximum of vinyl compound reacts, and consequently is lost by volatilization during the reaction process.

Catalysts suitable for use in this invention are of the free radical type. Examples are benzoyl peroxide, ditertiarybutyl peroxide, acetyl peroxide, $\alpha,\alpha'$-azodiisobutyronitrile, and the like. A concentration of catalyst in a range of 0.5 to 2 percent by weight, based on the vinyl compound, is preferred where catalyst is necessary. With acrylonitrile, the use of a catalyst during the reaction leads to a modified polyamide of essentially the same properties as when no catalyst is used. The desired amount of catalyst may be premixed with the polyamide and vinyl compound or it may be added to the mixture of polyamide and vinyl compound. However, catalyst should not be contacted with the vinyl compound in the absence of polyamide due to the tendency of the catalyst to induce homopolymerization of the vinyl compound.

The aforedescribed reactions for preparing modified polyamides may be carried out in a batchwise, semi-continuous, or continuous manner and it is not intended to limit the process to any particular method of operation.

The herein described modified polyamides are useful for application as components or major constituents of special film-forming compositions for protective and/or decorative purposes. They also find use in plastic compostions extrudable into tubing or various shapes or moldable into housewares, gears, and the like.

The softening point and complete melt point referred to by this invention are defined in accordance with the following apparatus and procedure:

A Fisher Johns melting point apparatus was supplemented with a vertical support holding a section of copper tubing which served as a guide for a 9 inch steel rod. A sample of the polyamide disc (approx. 0.01 in. thick) was trimmed until about 1 mm. on a side and placed in a cover glass on the hot stage at room temperature. Another cover glass was placed on top of the sample; the steel rod was lowered onto the surface and centered and balanced so that there was free motion with deformation. A micrometer dial gauge, reading to .0005, and held in a clamp mounted onto the support was lowered onto the top of the steel rod until the dial was deflected about midway. The constant weight of the sample consisted of the weight of the steel rod and the spring tension of the gauge; it totaled 80 p.s.i. against the sample. The heat was controlled manually so as to produce a slow and fairly constant rate of rise of temperature from room temperature to as high as 300° C. Notations were made of dial readings at frequent intervals as the temperature rose, and a graph was plotted with gauge deflection in .001 in. along the ordinant and temperature in ° C. along the abscissa. The initial portion of the curve which sloped upward was due to the expansion of the steel rod. At the point where the curve exhibited a change in slope, the corresponding temperature was recorded as the "softening point." When the sample melted to the liquid the expansion of the liquid caused a change in sign of the slope of the curve. The corresponding temperature was recorded as the "complete melt point."

In order to further describe the invention, the following examples set forth results obtained by carrying out embodiments of the invention and, for comparison purposes, results obtained by carrying out the process under identical conditions except for use of a vinyl compound not included in the group discovered as necessary in order to achieve the results of this invention. These examples and embodiments are illustrative only, and the invention is not in any way intended to be limited specifically thereto except as indicated by the appended claims. Unless otherwise set forth, the term "parts" means parts by weight.

EXAMPLE I

The polyamide feed material used in runs 1 through 6 to illustrate embodiments of this invention was prepared in the following manner:

181 g. of 2-ethylsuberic acid was dissolved in 1500 ml. of absolute ether. This solution was then placed in an ice bath, and 261.6 ml. of a methanolic solution containing 103.1 g. hexamethylene diamine was added dropwise with stirring. The resulting crystalline salt precipitate was collected by filtration and washed with three volumes of ether.

263 g. of the salt was charged to a glass polymerization tube along with 29.45 ml. of a methanolic solution of hexamethylene diamine prepared in the same manner as that described above. The tube was covered with aluminum foil and inserted into a pressure bomb. The bomb was flushed with nitrogen and at the same time warmed to distill off the methanol from the salt mixture. Following this, the bomb was sealed and the temperature gradually raised to 282° C. by means of methyl phthalate vapor. This temperature was maintained for about four hours. Pressure was maintained at 250 to 500 p.s.i. by bleeding off vapor. The bomb was then depressurized and the pressure gradually reduced to about 0.5 mm. After about six hours of heating at 282° C. under vacuum, the bomb was cooled, then brought to atmospheric pressure under a nitrogen blanket. The polymer was removed by breaking away the glass of the polymerization tube.

The polyamide obtained exhibited the following properties:

| Melt Point, ° C. | | Mol. Wt. | Intrinsic Viscosity | Tensile Strength | |
|---|---|---|---|---|---|
| Softening Point | Complete Melt | | | Ultimate | Percent Elongation |
| 40 | 180 | 23,100 | 1.135 | 6,900 | 210 |

*Run 1.*—Approximately 4 g. of the unmodified polyamide was pulverized in a laboratory Willey mill, and then charged to the mold of a Carver Laboratory hydraulic press. The temperature of the face plates of the press was regulated by electrical heating and water cooling, and measured by means of a thermometer well in the lower plate. The mold was closed and placed between the face plates. A pressure of about 400 p.s.i. was applied to compress the sample. A pressure of 8000 p.s.i. was then applied and maintained while the temperature of the mold was raised over a period of about 15 minutes to approximately 93° C. (200° F.), held there for 25 minutes, and allowed to return to room temperature over an additional 10 to 15 minutes. Hereafter, this step, which comprises the fusion of the confined mixture of reactants at elevated temperatures, will be referred to as a fusion reaction step. The molded plastic disc was removed from the mold, placed in a forced air oven, and heated over a period of 180 minutes at 70° C. Hereafter this step, which comprises heating the unconfined product, will be referred to as the conditioning step. The finished disc was hazy and slightly flexible. A piece of the unconditioned disc was placed in a jar and immersed in 10 ml. of ethanol. The jar was sealed and then stored for 24 hours in an oven regulated to 70° C. At the end of this time, the polyamide had dissolved completely, producing a clear, colorless solution. In a similar test run in concentrated hydrochloric acid for 24 hours at room temperature (about 20° C.) the polyamide completely dissolved to yield a clear, colorless solution. On another portion of the plastic disc, a softening point of 52° C. and a complete melt point of 170° C. were determined by means of the aforedescribed apparatus and technique. Thus, within the limits of experimental error, the properties of the subject polyamide remained unchanged upon submission to the above described treatment. The reaction conditions and properties of the treated unmodified polyamide as well as those of subsequent modified polyamides are presented in the table.

*Run 2.*—2.5 parts of the unmodified polyamide was pulverized and then intimately mixed with 1 part of acrylonitrile. The mixture was subjected to the same treatment as used for run 1 except that no pressure was applied during the fusion reaction step and the fusion reaction was carried out for 140 minutes at 90° C. The weight of the resulting plastic disc, after the fusion reaction step indicated a loss of acrylonitrile sufficient to increase the increase the ratio of polyamide to acrylonitrile to 14.7:1. A further loss in weight during the conditioning step increased this ratio to 15.0:1. Examination of the finished disc revealed that the reaction of only 1 part of acrylonitrile with 15 parts of polyamide resulted in substantial and unexpected changes in the properties of the polyamide. The softening point was increased over that of the unmodified polyamide by more than 100° C. This improvement occured during the fusion reaction step. In addition, the modified product, after the fusion reaction step, exhibited substantial increases in resistance to attack by either ethanol or concentrated hydrochloric acid as well as greater clarity.

*Run 3.*—4 parts of the unmodified polyamide was pulverized and then intimately mixed with 1 part of styrene. 0.0014 part of benzoyl peroxide was added and uniformly distributed in the mixture by further agitation. The resulting mixture was subjected to the same treatment as used for run 1 except that no pressure was applied during the fusion reaction step and the fusion reaction was carried out for 70 minutes at 107° C. The weight of the resulting plastic disc, after the fusion reaction and conditioning steps, indicated a loss of styrene sufficient to increase the ratio of polyamide to styrene to 8.5:1. Little improvement in softening point occurred during the fusion reaction step, however, marked improvement occurred during the conditioning step. Solubility tests performed on a portion of sample following the fusion reaction step revealed marked improvement in resistance to ethanol and concentrated hydrochloric acid.

*Run 4.*—6.5 parts of the unmodified polyamide was pulverized and then intimately mixed with 1 part of vinyl toluene. 0.0183 part of benzoyl peroxide was added and uniformly distributed in the mixture by further agitation. The resulting mixture was subjected to the same treatment as used for run 1 except that no pressure was applied during the fusion reaction step and the fusion reaction was carried out for 140 minutes at 135° C. The calculated ratio of polyamide to vinyl toluene increased to 7.9:1 during the fusion reaction step, and to 8.3:1 during the conditioning step. The improvement in softening point occurred during the conditioning step. However, following the fusion reaction step, samples exhibited marked improvement in resistance to ethanol and concentrated hydrochloric acid.

*Run 5.*—In this run a polymer, polyacrylonitrile, was treated as a modifier. 12.8 parts of the unmodified polyamide was pulverized and then intimately mixed with 1 part of polyacrylonitrile. The mixture was subjected to a fusion reaction for 60 minutes at 232° C., no pressure being applied during the heating step. The product from this step, was non-homogeneous; unfused polyacrylonitrile particles remained suspended in a matrix of polyamide. No increase in softening point had been imparted to the polyamide. Thus, the behavior of polymerized acrylonitrile was in sharp contrast to that observed with acrylonitrile monomer (see run 2).

*Run 6.*—5 parts of the unmodified polyamide was pulverized and then intimately mixed with 1 part of vinyl acetate. 0.0045 part of benzoyl peroxide was added and uniformly distributed in the mixture by further agitation. The resulting mixture was subjected under a pressure of 1500 p.s.i. to fusion reaction conditions of 200° C. for 90 minutes. The product exhibited approximately the same properties of softening point, solubility, and haze as the unmodified polyamide. Therefore, vinyl acetate cannot be considered an operable vinyl modifier within the framework of this invention.

EXAMPLE III

A polyhexamethylene amide was prepared by standard techniques from the following mixture of dicarboxylic acids: 50% of 2-ethylsuberic acid, 42% of sebacic acid, and 8% of 2,5-diethyladipic acid. The polyamide had an intrinsic viscosity of 1.2 (in 90% formic acid) and showed a softening range from 120° (initial softening) to 174° C. (final melt). This copolyamide was combined with acrylonitrile in a weight ratio of 9:1; 1% of $\alpha,\alpha'$-azodiisobutyronitrile based on the acrylonitrile was added. The ingredients were mixed thoroughly in a laboratory mixer under an atmosphere of nitrogen and the resulting powder was sealed in a glass tube and heated at 93° C. for 90 minutes. The resulting product exhibited an initial softening point of 150° C. with complete melt at 209° C. The product showed very slight solubility in ethanol compared to very ready solubility of the copolyamide employed as a starting material.

EXAMPLE IV

A copolyamide was prepared from hexamethylene diamine together with 2-ethylsuberic acid and azelaic acid in a ratio of approximately 55/45. The polymer had an intrinsic viscosity (in 90% formic acid) of 1.3, and initial softening point of 95° C. with complete melt at 174° C. Fifty grams of this polyamide was combined with 10 grams of acrylonitrile and 0.3 gram of $\alpha,\alpha'$-azodiisobutyronitrile in a laboratary Z-blade mixer. The mixer was sealed, the atmosphere in the mixer was flushed with nitrogen, mixing was begun and the temperature was raised gradually to 107° C. After a period of 90

*Table*

| | Modifier | | | | | |
|---|---|---|---|---|---|---|
| | Run 1 | Run 2 | Run 3 | Run 4 | Run 5 | Run 6 |
| | None | Acrylonitrile | Styrene | Vinyl Toluene | Polyacrylonitrile | Vinyl Acetate |
| Reaction Conditions Polyamide/Modifier (In product) | | 15.0 | 8.5 | 8.3 | 12.8 | 5.0. |
| Catalyst | None | None | benzoyl peroxide. | benzoyl peroxide. | None | benzoyl peroxide. |
| Fusion Step | 25′ @ 93° C | 140′ @ 90° C | 70′ @ 107° C | 140′ @ 135° C | 60′ @ 232° C | 90′ @ 200° C. |
| Conditioning Step | 180′ @ 70° C | 180′ @ 70° C | 180′ @ 70° C | 180′ @ 70° C | None | None. |
| Properties of Product After Fusion: | | | | | | |
| Softening Point, ° C | 52 | 150 | 43 | 40 | 42 ᵃ | 46. |
| Complete Melt Pt., ° C | 170 | 190 | 162 | 173 | 160 ᵃ | 176. |
| Sol. in Ethanol | V.S | V.Sl.S | Sl.S | V.Sl.S | | V.S. |
| Sol. in Conc. HCl | V.S | V.Sl.S | Sl.S | V.Sl.S | | V.S. |
| After Conditioning: | | | | | | |
| Softening Point, ° C | 50 | 156 | 120 | 211 | | |
| Complete Melt Pt., ° C | 190 | 198 | 169 | 185 | | |
| Clarity | | Slight Haze | Clear | Clear | | |
| Hardness | Sward 32 | Harder | Harder | Harder | | |
| Flexibility | Slight | More Rigid | More Rigid | More Rigid | | |

ᵃ Sample after fusion non-homogeneous; unfused polyacrylonitrile particles visible.

EXAMPLE II

By standard polyamidification techniques a polymer was prepared from hexamethylene diamine and a $C_{10}$ dicarboxylic acid mixture having the following composition: 75% of 2-ethylsuberic acid, 13% of sebacic acid and 12% of 2,5-diethyladipic acid. The polyamide exhibited an intrinsic viscosity of 1.27 (in 90% formic acid) and softened over a wide range of temperature beginning around 31° C. and reaching a total melt at approximately 180° C. Four parts of this polyamide was combined with one part of styrene in a laboratory Z-blade mixer. The mixing cavity was flushed with nitrogen, the mixer was closed and temperature of the ingredients was raised to 93° C. After 30 minutes heating was discontinued, and the reaction mixture was allowed to cool with continued mixing; the granulated product was stored in a vacuum desiccator overnight and subsequently pressed into a disc ⅛″ thick by 1″ in diameter at a temperature of 150° C. and allowed to cool slowly to room temperature. This product exhibited an initial softening point at 115° C. and complete melt at 184° C.

minutes the heat was turned off and the polymer mixture was allowed to cool. The product was transferred to a vacuum oven and maintained at 70° C. for a period of 2 hours. Analysis of the product product showed a ratio of polyamide to acrylonitrile residue of 15 to 1. The product exhibited an initial softening point of 158° C. with complete melt at 206° C.

EXAMPLE V

Sixty-five grams of a polyamide prepared from hexamethylene diamine together with a mixture of dicarboxylic acids composed of 2-ethylsuberic, 2,5-diethyladipic, sebacic and adipic acids in a weight of 50/10/5/35 was combined with 10 grams of vinyl toluene and 0.8 gram of benzoyl peroxide. The compounds were mixed thoroughly and then compacted into a 70-mil sheet by means of a laboratory press and a mold. The sheet was subsequently placed in an oven at 120° C. for a period of 120 minutes and allowed to cool slowly to room temperature. The product exhibited an initial softening point of 135° C., complete at 185° C. (compared to values of 75° and 156° C. for the unmodified polyamide) and limited solubility in ethanol (compared to complete solubility for the unmodified polyamide).

The foregoing data show that by utilizing the present invention the properties of certain polyamides can be advantageously improved by the use of specific modifying agents. It will be understood, of course, that while certain embodiments of this invention are illustrated above, that the invention is obviously subject to variations and modifications without departing from its broader aspects.

What is claimed is:

1. A process for improving the properties of a polyamide prepared by reacting (*a*) a dicarboxylic acid selected from the group consisting of branched chain $C_{10}$ saturated aliphatic acids and mixtures thereof with straight chain $C_6$ to $C_{10}$ saturated aliphatic acids with (*b*) a diamine having at least one hydrogen atom attached to each nitrogen atom which comprises reacting said polyamide at a temperature between about 80° and 300° C. with vinyl compound selected from the group consisting of acryonitrile, styrene, and vinyl toluene in the presence of an added free radical polymerization catalyst, the amount of said vinyl compound being in the range of about 0.05 to 0.25 part per part of said polyamide.

2. The process of claim 1 wherein said dicarboxylic acid is 2-ethylsuberic acid.

3. The process of claim 1 wherein said dicarboxylic acid comprises a mixture of 2-ethylsuberic acid, 2,5-diethyladipic acid and sebacic acid.

4. The process of claim 3 wherein said mixture also contains adipic acid.

5. The process of claim 1 wherein said dicarboxylic acid is a mixture of 2-ethylsuberic acid and azelaic acid.

6. The process of claim 1 wherein said vinyl compound is acrylonitrile.

7. The process of claim 1 wherein said vinyl compound is styrene.

8. The process of claim 1 wherein said vinyl compound is vinyl toluene.

9. The product obtained by reacting at about 80° to 300° C. in the presence of an added free radical polymerization catalyst (1) a polyamide prepared by reacting (*a*) a dicarboxylic acid selected from the group consisting of branched chain $C_{10}$ saturated aliphatic acids and mixtures thereof with straight chain $C_6$ to $C_{10}$ saturated aliphatic acids with (*b*) a diamine having at least one hydrogen atom attached to each nitrogen atom with (2) a vinyl compound selected from the group consisting of acrylonitrile, styrene, and vinyl toluene, the amount of said vinyl compound being in the range of about 0.05 to 0.25 part per part of said polyamide.

10. The product of claim 9 wherein said vinyl compound is acrylonitrile.

11. The product of claim 9 wherein said vinyl compound is styrene.

12. The product of claim 9 wherein said vinyl compound is vinyl toluene.

References Cited in the file of this patent

UNITED STATES PATENTS

| | | |
|---|---|---|
| 2,539,438 | Kropa et al. | Jan. 30, 1951 |
| 2,816,916 | Frank et al. | Dec. 17, 1957 |
| 2,837,496 | Vandenberg | June 3, 1958 |

FOREIGN PATENTS

| | | |
|---|---|---|
| 679,562 | Great Britain | Sept. 17, 1952 |
| 809,558 | Great Britain | Feb. 25, 1959 |
| 1,130,100 | France | Sept. 17, 1956 |
| 1,161,824 | France | Mar. 31, 1958 |

OTHER REFERENCES

Harwood et al.: "The Effects of Radiation of Materials," pages 299 and 300, published by Reinhold, New York (1958).